US006850990B1

(12) United States Patent
Howarth et al.

(10) Patent No.: US 6,850,990 B1
(45) Date of Patent: Feb. 1, 2005

(54) TRANSFER OF SYNCHRONIZED DATA FROM 16-BIT CODE TO A 32-BIT PROCESS

(75) Inventors: Mark E. Howarth, South Jordan, UT (US); David A. Jensen, Cedar Hills, UT (US)

(73) Assignee: LANDesk Software Limited, Dublin (IE)

( * ) Notice: Subject to any disclaimer, the term of this patent is extended or adjusted under 35 U.S.C. 154(b) by 0 days.

(21) Appl. No.: 09/353,211

(22) Filed: Jul. 14, 1999

(51) Int. Cl.[7] .............................................. G06F 15/16
(52) U.S. Cl. .................................... 709/246; 709/248
(58) Field of Search ................................. 709/246, 248, 709/102; 714/3, 12

(56) References Cited

U.S. PATENT DOCUMENTS

| | | | | |
|---|---|---|---|---|
| 4,728,930 A | * | 3/1988 | Grote et al. .................. | 341/101 |
| 4,837,675 A | * | 6/1989 | Bean et al. ...................... | 714/5 |
| 5,124,698 A | * | 6/1992 | Mustonen .............. | 340/825.21 |
| 5,335,234 A | * | 8/1994 | Matteson et al. ........... | 714/756 |
| 5,355,504 A | * | 10/1994 | Nedwek ....................... | 712/13 |
| 5,423,021 A | * | 6/1995 | Thome et al. .............. | 711/211 |
| 5,487,158 A | * | 1/1996 | Amelina et al. ............ | 717/136 |
| 5,490,256 A | * | 2/1996 | Mooney et al. ............ | 712/227 |
| 5,495,522 A | * | 2/1996 | Allen et al. ............ | 379/202.01 |
| 5,606,707 A | * | 2/1997 | Tomassi et al. ............ | 345/418 |
| 5,638,370 A | * | 6/1997 | Seconi et al. ................ | 370/466 |
| 5,734,904 A | * | 3/1998 | Kanamori et al. .......... | 709/331 |
| 5,838,911 A | * | 11/1998 | Rosenhauer et al. ........ | 709/203 |
| 5,854,939 A | * | 12/1998 | Wollan et al. ................. | 712/1 |
| 5,890,219 A | * | 3/1999 | Scaringella et al. ........ | 711/162 |
| 5,964,843 A | * | 10/1999 | Eisler et al. ................ | 709/323 |
| 5,968,164 A | * | 10/1999 | Loen et al. .................. | 712/204 |
| 5,982,322 A | * | 11/1999 | Bickley et al. ......... | 342/357.08 |
| 6,055,619 A | * | 4/2000 | North et al. .................. | 712/36 |
| 6,098,110 A | * | 8/2000 | Witkowski et al. .......... | 709/249 |
| 6,118,825 A | * | 9/2000 | Ikeda et al. ................. | 375/259 |
| 6,148,325 A | * | 11/2000 | Schmidt et al. ............. | 709/107 |
| 6,158,046 A | * | 12/2000 | Yoshida et al. ................. | 717/5 |
| 6,170,049 B1 | * | 1/2001 | So ............................... | 712/35 |
| 6,275,552 B1 | * | 8/2001 | Ando ......................... | 340/905 |
| 6,295,561 B1 | * | 9/2001 | Nagy ......................... | 709/246 |
| 6,298,370 B1 | * | 10/2001 | Tang et al. .................. | 709/102 |
| 6,360,242 B1 | * | 3/2002 | Hayashi ...................... | 708/709 |
| 6,363,409 B1 | * | 3/2002 | Hart et al. ...................... | 709/1 |

OTHER PUBLICATIONS

Ray, "Explore the Depth and Impact of OS/2's New 32–bit API", PC Magazine V9, n11, p. 359(4) Jun. 12, 1990.*
Ray, "Examining the Development of Semaphore in OS/2", PC Magazine v9, n15, p. 115(4), Sep. 11, 1990.*

(List continued on next page.)

*Primary Examiner*—Bunjob Jaroenchonwanit
(74) *Attorney, Agent, or Firm*—Madson & Metcalf

(57) ABSTRACT

The 16-bit process receives synchronized data from a hooked data function. As memory becomes available in a shared memory buffer, the 16-bit process writes the synchronized data to the buffer. The 16-bit process then signals the 32-bit process that synchronized data is ready to be transmitted over the network. The 32-bit process reads the synchronized data, stores it in a send buffer to free the shared memory buffer, then signals the 16-bit process that the shared memory buffer has been read. The 32-bit process then sends the synchronized data out over the network. In this way, a "thunk" that improperly releases the mutual exclusion semaphore is avoided.

There can be more than one shared memory buffer, to allow the 16-bit process and the 32-bit process to read and write synchronized data to the shared memory buffers at the same time.

The 16-bit process can use a callback function to ensure that data does not wait in the shared memory buffers for too long before it is ready by the 32-bit process and sent out over the network.

36 Claims, 7 Drawing Sheets

OTHER PUBLICATIONS

Lam, "Cross–Platform Communication Classes", Dr. Dobb's Journal, Mar. 1995, 12 pages.*

"Willow Without Weeping" Marshall, Andrew. EXE, V5, n11, May 1991 (5 pages).*

Walter, Mix 16–bit and 32–bit code in the applications with the Win32s universal thunk, computer select Nov. 1993, 14 pages.*

16 to 32 bit operating system compatibility method of personal computers, IBMTDB Sep. 1991, 3 pages.*

Memory Protection Software Facility for OS/2 Shared Data Applications IBMTDB, Sep. 1991 V34 NR 4A pp. 81–89 (4 pages).*

Cooper et al, C Threads, Carnegie Mellon University, Sep. 11, 1990, 18 pages.*

Andrew Schulman, Unauthorized Windows 95—A Developer's Guide to Exploring the Foundations of Windows "Chicago", Oct. 1994, pp. 547–557.

Intel, "Intel LANDesk Management Suite 6.1 User's Guide", Apr. 20, 1998, pp. 11–15 and 73–101.

Intel "Intel LANDesk Management Suite 6.1 release notes", Apr. 20, 1998, 27 pages.

* cited by examiner

FIG. 1 (Dataflow)

TRANSFER OF SYNCHRONIZED DATA FROM 16-BIT CODE TO A 32-BIT PROCESS

FIELD OF THE INVENTION

This invention relates generally to a method and apparatus for ensuring that data generated by a 16-bit program running on a remote computer is properly synchronized for transmission to a local computer system and, more particularly, to the local display of data generated on a remote computer system.

BACKGROUND OF THE INVENTION

Computer system operators often find that they need to operate their computer systems remotely. For example, telecommuters need to operate their office computer from another location, often from their home. Software exists that allows remote control of a computer system. Such software allows a user to see on a local display terminal the screen the user would see if she were seated before the remote terminal.

A large percentage of today's computer systems run some variant of the Microsoft Windows® operating system. The first version of the operating system to achieve a broad customer base was version 3.1. Much software has been written to operate under Windows 3.1. Since Windows 3.1 is a 16-bit operating system, software designed to run under Windows 3.1 is written as 16-bit code. Windows 3.1 is also a non-preemptive, single-threaded operating system. When a 16-bit program starts running under the Windows 3.1 operating system, it cannot be interrupted by another 16-bit program until the first 16-bit program naturally terminates. This prevents critical segments of 16-bit code from executing simultaneously.

Later versions of Windows include Windows 95 and Windows 98, both of which are 32-bit operating systems. Code written specifically for the Windows 95 or Windows 98 operating systems can take advantage of the 32-bit operating system. Windows 95 and Windows 98 are designed to be backward-compatible, so that 16-bit software will generally operate under the newer versions of the operating system. Specifically, Windows 95 and Windows 98 allow calls to 16-bit Graphical Device Interface (GDI) functions. But because Windows 95 and Windows 98 are preemptive, multi-threaded operating systems, multiple segments of code can execute simultaneously. To prevent multiple critical threads of 16-bit code from executing simultaneously, Windows 95 introduced and Windows 98 retained a mutual exclusion semaphore. This semaphore allows a 16-bit program to specify which segments of code are critical and to "lock" the semaphore, thereby preventing other critical segments of 16-bit code from executing.

But when a 16-bit process is run on a remote 32-bit operating system, a problem can occur. Because the specific GDI functions used by the 16-bit process are themselves written for a 16-bit operating system, the 16-bit program cannot be re-compiled as a 32-bit program. But the software that controls data-flow from the computer to a network in Windows 98 and later versions of Windows 95 and is specially implemented for the 32-bit version of the operating system. (This software is called Winsock 2.) When a 32-bit Winsock function is called from a 16-bit process to transmit data over a network, a "thunk" must be performed. A "thunk" is a transition between the 16-bit program and the 32-bit operating system. A "thunk" occurs when the 16-bit program calls a 32-bit operating system function, or when the 32-bit operating system function returns control to the 16-bit program. One consequence of a "thunk" is that it releases the mutual exclusion semaphore, even though the 16-bit process may not be ready to release the semaphore. When the semaphore is released, other 16-bit programs that generate display data are unblocked and are released to run. This causes ordering problems in the display data.

SUMMARY OF THE INVENTION

The invention is implemented in part by a pair of software programs. A 32-bit process prepares a shared memory area into which the 16-bit process will write the synchronized data. The 32-bit process will read the data from the shared memory area and transmit the data across the network. Since the 32-bit process can call 32-bit operating system functions without using a "thunk," the mutual exclusion semaphore will not be released prematurely. The 16-bit and 32-bit processes communicate through signals established by the 32-bit process.

DETAILED DESCRIPTION OF THE PREFERRED EMBODIMENT

Figure 1:
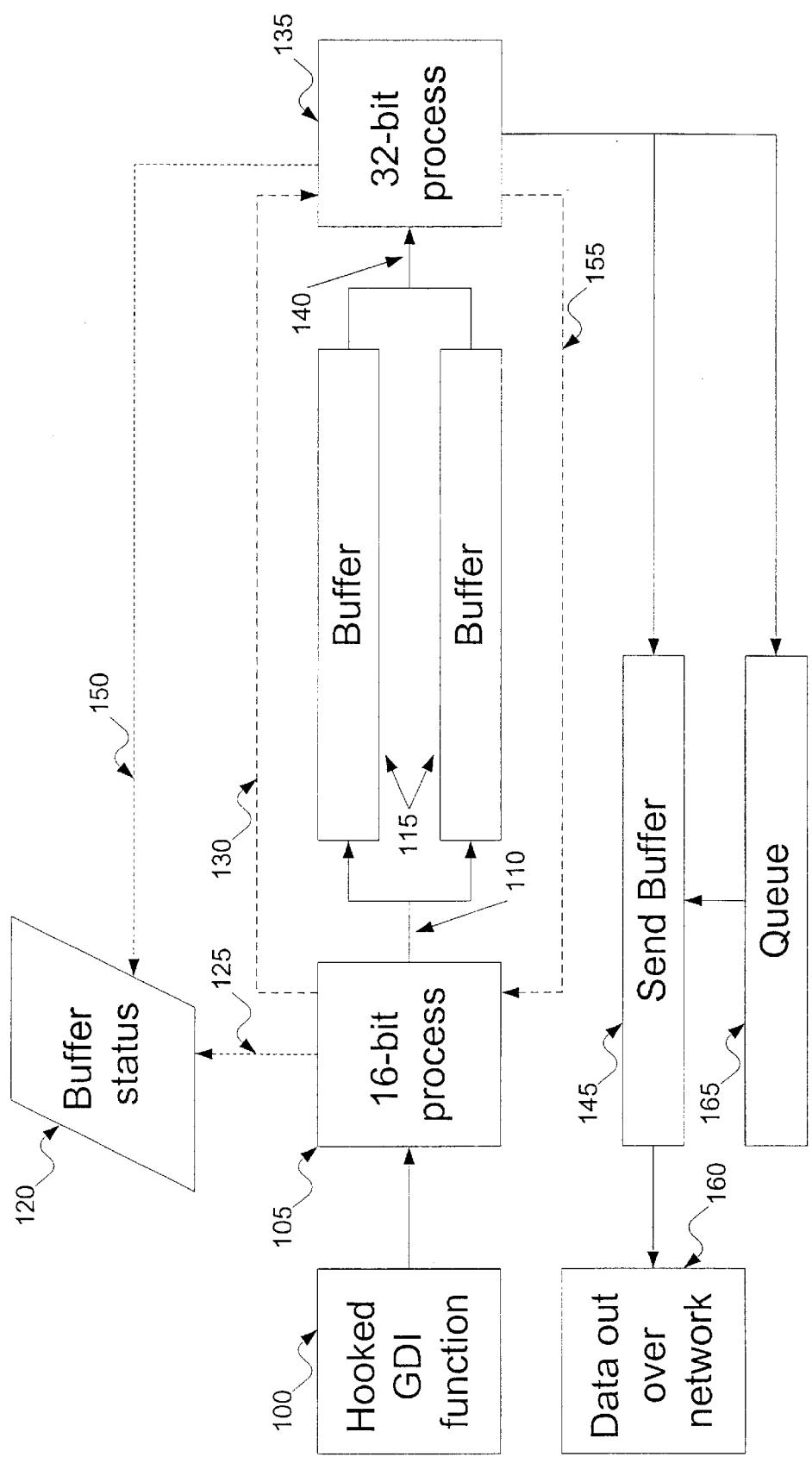
FIG. 1 shows a dataflow diagram of how data is synchronized by the invention.

FIG. 1 shows how GDI data flows between the 16-bit and 32-bit processes. In this patent, the term "process" includes all forms of executable code for a computer, including but not limited to applications programs, DLLs, threads within an application program, and functional blocks of code within a computer program. In FIG. 1, solid lines represent dataflow, medium-dashed lines represent signals, and short-dashed lines represent variable assignments. A hooked Graphical Device Interface (GDI) function 100 feeds GDI data to the 16-bit process 105. Although in FIG. 1 the synchronized data is graphical data, a person skilled in the art will recognize that other types of data may need to be synchronized. The 16-bit process 105 hooks the GDI function 100 by modifying the display driver to call the 16-bit process 105 instead of writing directly to the display. A person skilled in the art will realize that the hooked GDI function 100 is written in 16-bit code and must acquire the mutual exclusion semaphore before it can give the GDI data to the 16-bit process 105. The 16-bit process 105 then checks to see if it can write the GDI data 110 to the shared memory buffer 115. The 16-bit process 105 accomplishes this check 110 by checking the buffer status variable 120. The buffer status variable 120 is shared between the 16-bit 105 and 32-bit processes 135, and both the 16-bit 105 and 32-bit processes 135 can read from and write to the buffer status variable 120. In the preferred embodiment, the buffer status variable 120 has three states: "empty," "full," and "being filled."

If the buffer status variable 120 indicates that the buffer 115 is not yet "full" (i.e., the buffer status variable 120 is in state "empty" or "being filled"), the 16-bit process 105 writes the GDI data 110 to the shared memory buffer 115. Otherwise the 16-bit process 105 blocks until it receives a BufferReadEvent signal 155 from the 32-bit process 135. When the 16-bit process 105 receives the BufferReadEvent signal 155, the 16-bit process 105 knows the shared memory buffer 115 has been read by the 32-bit process 135. Although FIG. 1 shows two shared memory buffers 115 as in the preferred embodiment, a person skilled in the art will recognize that the number of shared memory buffers 115 can vary, as can their size. Using more than one shared memory buffer 115 allows the 16-bit process 105 to write to one shared memory buffer 115 while the 32-bit process 135 reads GDI data from another shared memory buffer 115. Not shown in FIG. 1 are variables for the 16-bit 105 and 32-bit processes 135 to know which shared memory buffer 115 to write to/read from. In the preferred embodiment, the shared memory buffers 115 are 32K in size.

After the 16-bit process 105 has written the GDI data 110 into the shared memory buffer 115, the 16-bit process 105 sets the buffer status variable 120 either to "full" or to "being filled" 125, depending on whether or not the shared memory buffer 115 is full. The 16-bit process 105 then sends a BufferFullEvent signal 130 to the 32-bit process 135 and waits to receive more GDI data from a hooked GDI function 100.

When the 32-bit process 135 receives a BufferFullEvent signal 130 from the 16-bit process 105, the 32-bit process 135 reads the GDI data 140 from the shared memory buffer 115 and writes it into the send buffer 145. After all the GDI data have been read from the shared memory buffer 115, the 32-bit process 135 sets the buffer status variable 120 to "empty" 150 and sends a BufferReadEvent signal 155 to the 16-bit process 105. The 32-bit process 135 then waits to receive another BufferFullEvent signal 130 from the 16-bit process 105. The GDI data in the send buffer 145 is then sent out over the network 160 to the local user.

It may happen that the GDI data in the shared memory buffer 115 exceeds the available space in the send buffer 145. If the 32-bit process 135 were to block waiting for the send buffer 145 to empty as GDI data is sent out over the network 160, the system can deadlock. To avoid the deadlock, the 32-bit process 135 instead writes the overflow GDI data into a queue 165. Then, as the send buffer 145 clears, the 32-bit process copies data from the queue 165 into the send buffer 145 to be sent over the network 160. The queue 165 is a first-in, first-out network, which preserves the order of the data read by the 32-bit process 135 from the shared memory buffer 115.

In the preferred embodiment, the 32-bit process 135 is an application program. After the 32-bit process 135 has prepared the shared memory buffer 115 and the BufferFullEvent 130 and BufferReadEvent signals 155 (see FIG. 2), the 32-bit process 135 loads the 16-bit process 105. The 16-bit process 105 is stored in a Dynamic Link Library (DLL). However, a person skilled in the art will recognize that the 16-bit process 105 can also be stored in other ways, such as an application program.

In the preferred embodiment, the 32-bit process 135 reads the shared memory buffer 115 and transmits the data over the network 160 in two distinct threads that are part of the same 32-bit process 135. However, a person skilled in the art will recognize that the two threads can be implemented as separate programs and can also be combined in a single thread.

Figure 7:
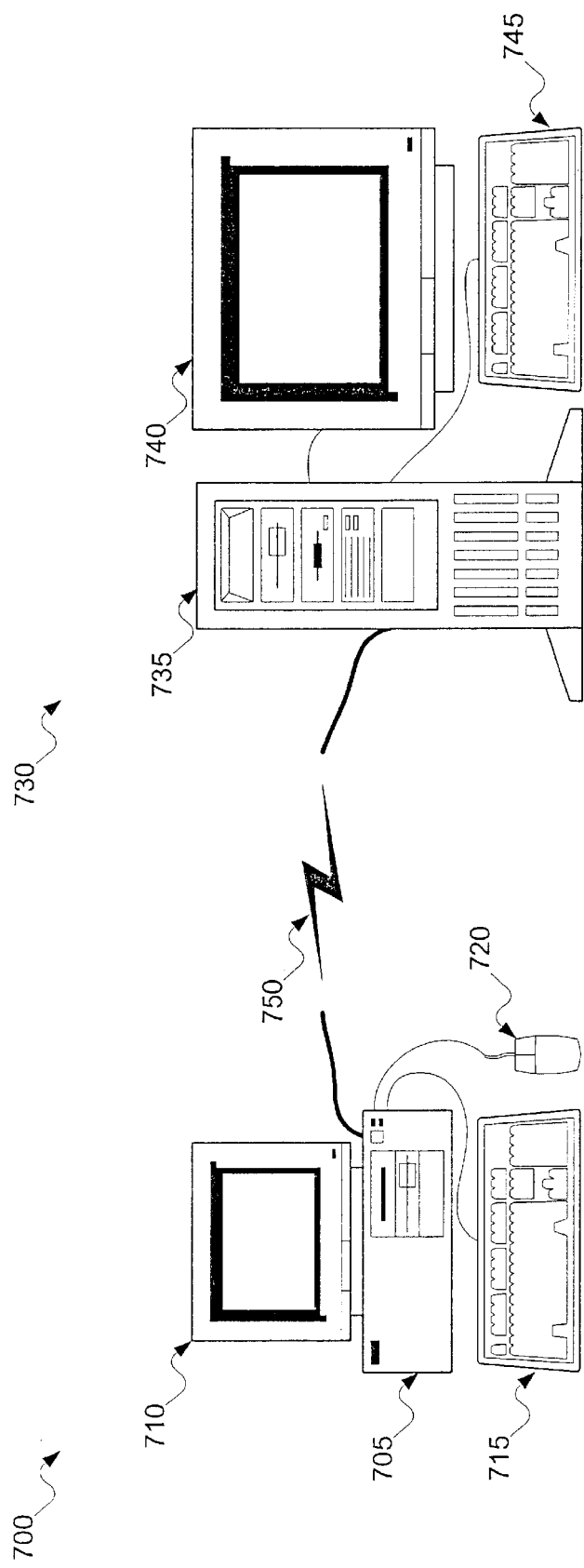
FIG. 7 shows a local computer controlling a remote computer over a network.

FIG. 7 shows the context in which synchronized data transfer is necessary. In FIG. 7, a user (not shown) can operate a local computer system 700. The user uses local computer system 700 to control a remote computer system 730 over a network 750. Computer systems 700 and 730 each have a computer 705, 735, a monitor 710, 740, and a keyboard 715, 745. Local computer system 700 is also shown with a mouse 720. Remote computer system 730 can also have a mouse (not shown). Computer systems 700 and 730 can also have a variety of other peripherals not shown in FIG. 7: for example, printers, drawing tablets, modems, etc. As the user manipulates local computer system 700, the manipulation data is transmitted over network 750 to remote computer system 730. The manipulations are performed on remote computer system 730, which generates graphical data in the form of GDI data. This GDI data is then transmitted back to local computer system 700 over network 750, where the GDI data is shown on monitor 710.

Figure 2:
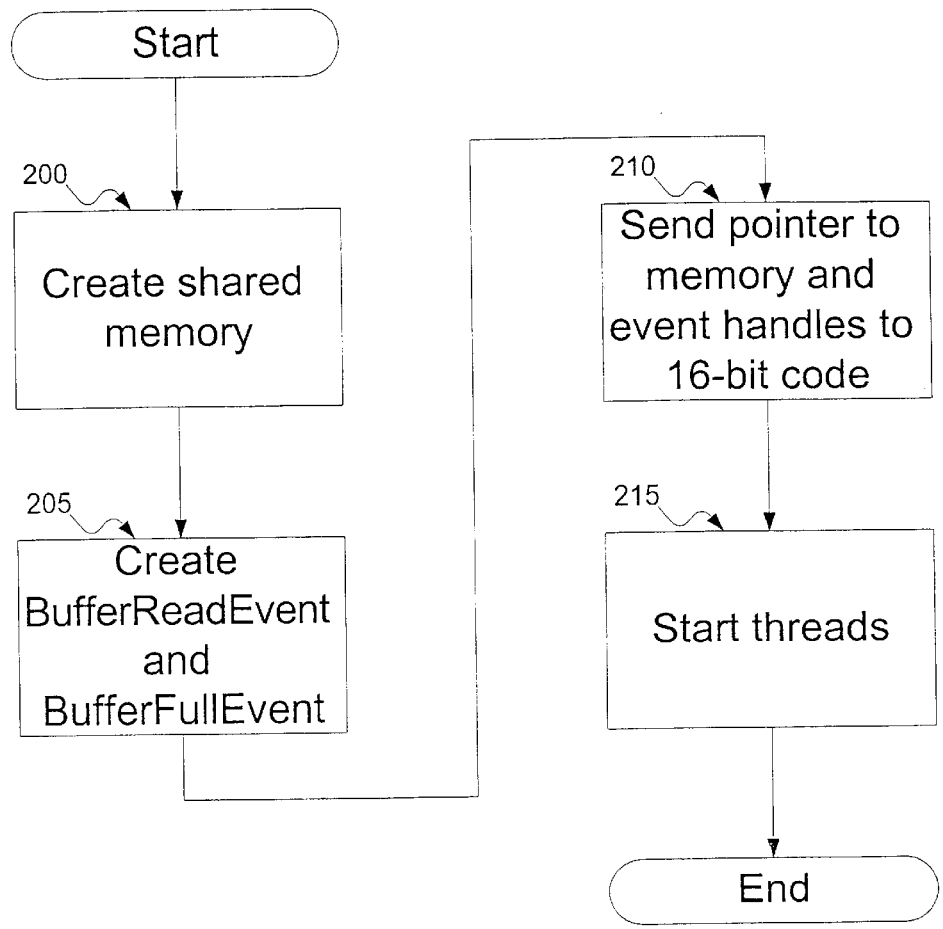
FIG. 2 shows a flowchart of how the preferred embodiment of the invention is initiated.

FIG. 2 shows the steps used by the 32-bit process 135 to initiate the method of synchronizing data. At step 200, the 32-bit process 135 creates the shared memory buffer 115. The 32-bit process 135 can also create at this time the buffer status variable 120 and any other shared memory used by both the 32-bit process 135 and the 16-bit process 105. At step 205, the 32-bit process 135 establishes the BufferReadEvent and BufferFullEvent signals 130, 155 so that the 32-bit process 135 and 16-bit process 105 can communicate. At step 210, the 32-bit process 135 gives the 16-bit process 105 the event handles for the BufferReadEvent and BufferFullEvent signals 130, 155, and tells the 16-bit process 105 where it can find the shared memory. Lastly, at step 215, the 32-bit process creates the 32-bit threads that move GDI data from the shared memory buffer 115 to the send buffer 145 and then send the GDI data out over the network 160.

Figure 3:
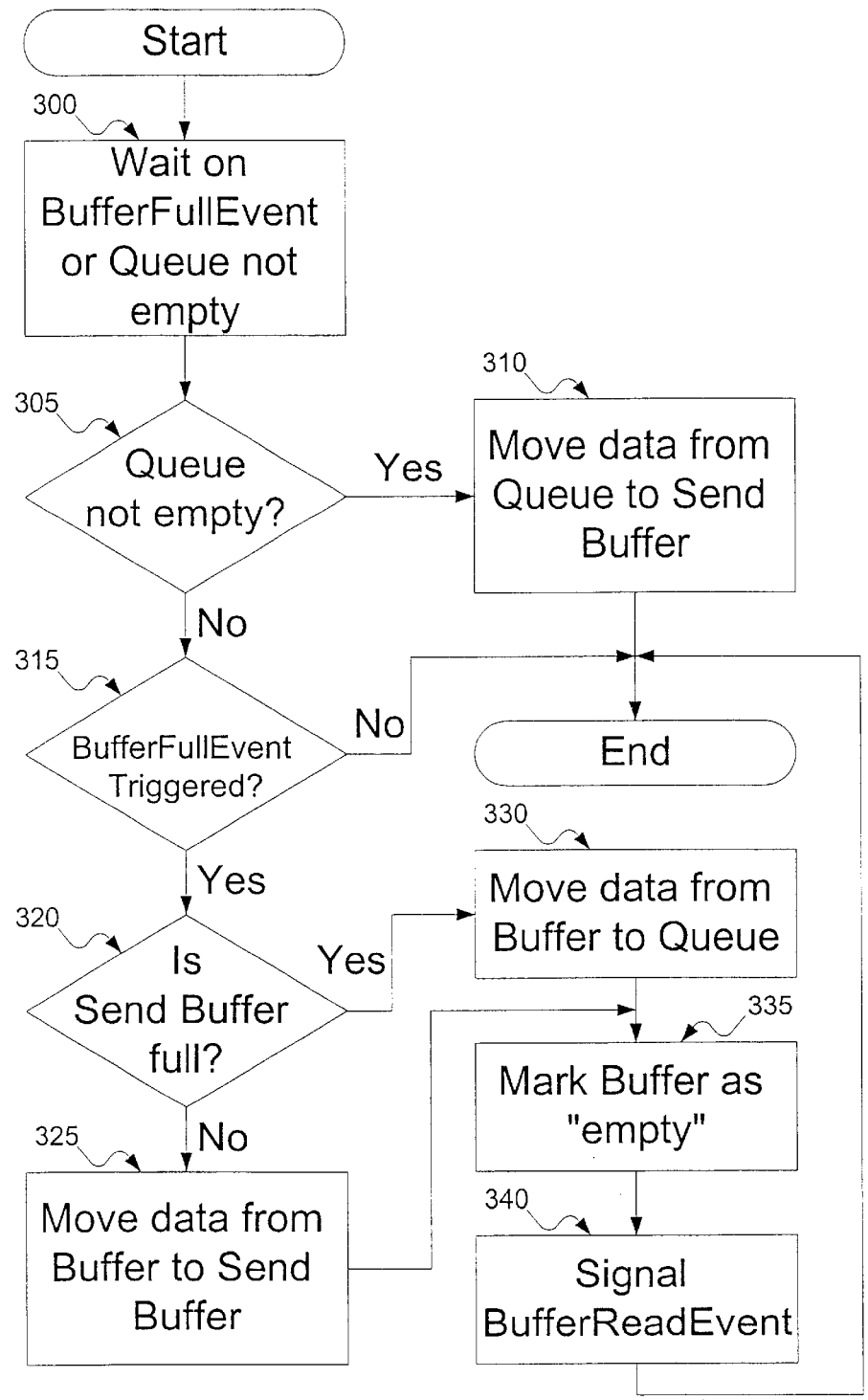
FIG. 3 shows a flowchart of the 32-bit process thread that receives the data from the 16-bit process.

FIG. 3 shows the steps the 32-bit thread follows to receive the GDI data from the 16-bit process 105. At step 300 the thread waits until it has a reason to act. There are two reasons the thread might activate: if the thread receives a BufferFullEvent signal 130 from the 16-bit process 105, and if the queue 165 is not empty and the send buffer 145 is not full. If the queue 165 is not empty (step 305), then the thread moves GDI data from the queue 165 to the send buffer 145 (step 310). Otherwise, if the thread receives a BufferFullEvent signal 130 from the 16-bit process 105 (step 315), the thread copies GDI data from the shared memory buffer 115 to the send buffer (step 325). If the send buffer 145 is full (step 320), then the thread copies the GDI data into the queue 165 (step 330). Once the GDI data is completely copied from the shared memory buffer 115, then at step 335 the thread sets the buffer status variable 120 as "empty" 150. The thread then sends a BufferReadEvent signal 155 to the 16-bit process 105 (step 340).

A person skilled in the art will recognize that FIG. 3 is an approximation of the 32-bit process thread. For example, the queue 155 will generally store several times the amount of data the send buffer 145 can store. Therefore, the thread may have to loop several times to empty the queue 145 of overflow GDI data received from the shared memory buffer 115. Similarly, the send buffer 145 may not be full at step 320 when the thread begins to write GDI data into the send buffer 145, but the send buffer 145 may become completely full before all the GDI data is written. In that case, part of the GDI data will be written to the send buffer 145 in step 325, and the excess will be stored in the queue 145 in step 330.

Figure 4:
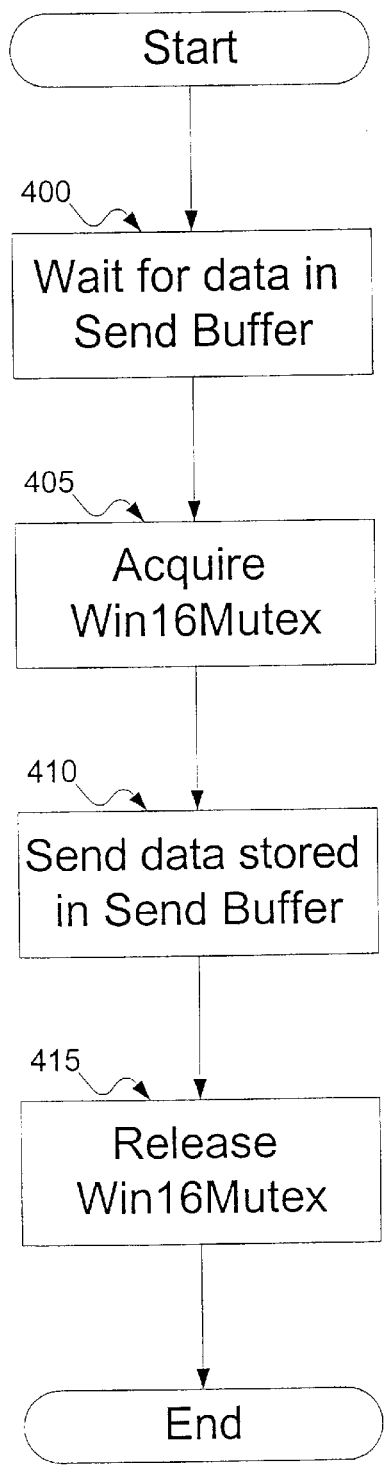
FIG. 4 shows a flowchart of the 32-bit process thread that takes the synchronized data and transmits it over the network.

FIG. 4 shows the 32-bit thread that transmits the data from the send buffer 145 to the network 160. The thread waits at step 400 until there is data in the send buffer 145. The thread acquires the mutual exclusion semaphore, (step 405) to forestall the 16-bit process from generating more synchronized GDI data. The thread then transmits the data (step 410) and releases the semaphore (step 415).

Figure 5:
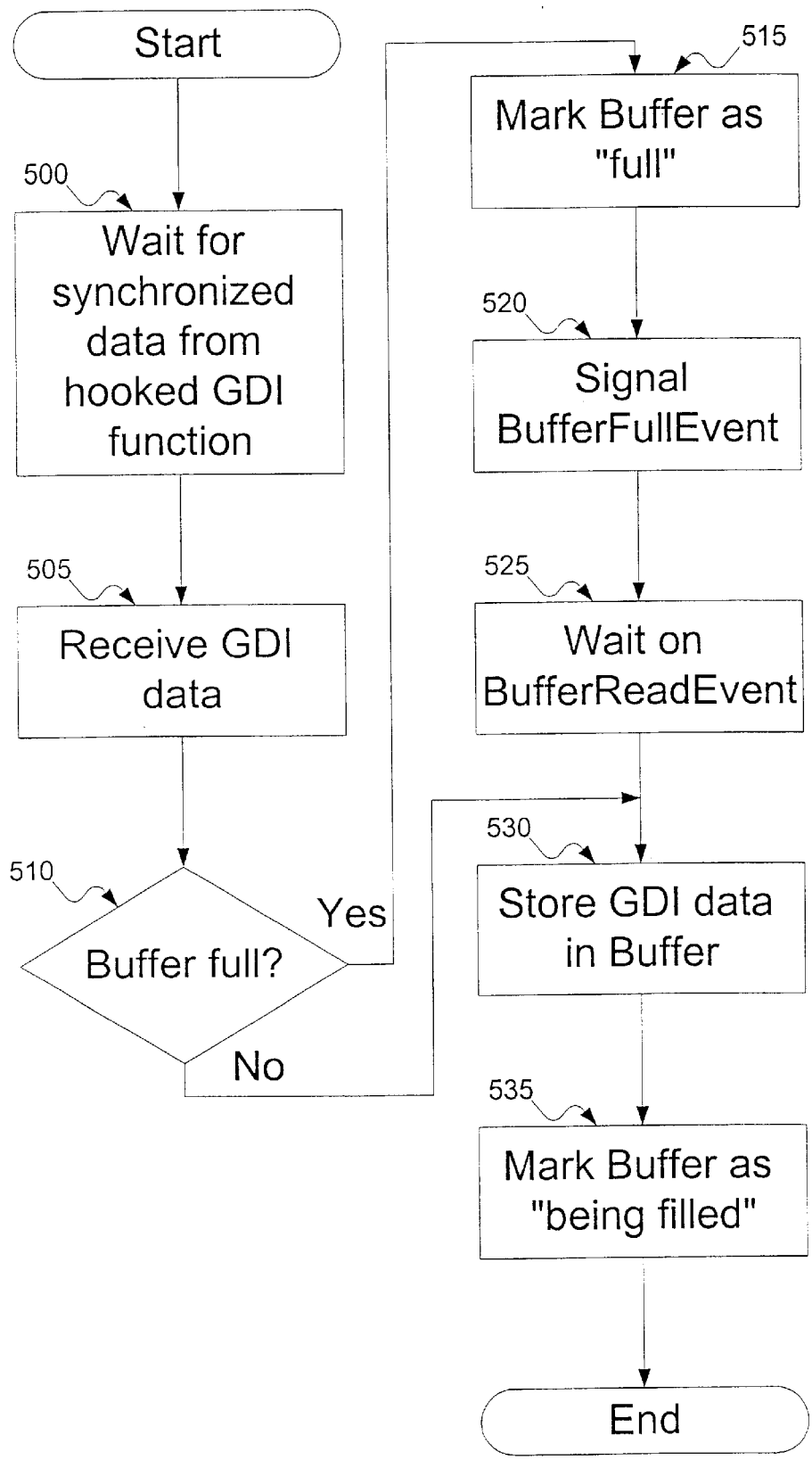
FIG. 5 shows a flowchart of the 16-bit process that receives the display data and passes it to the 32-bit process for transmission.

FIG. 5 shows how the 16-bit process 105 copies the GDI data it receives from the hooked GDI function 100 into the shared memory buffer 115. At step 500 the 16-bit process 105 waits until there is GDI data to store in the shared memory buffer 115. At step 505, the 16-bit process 105 receives the GDI data. The 16-bit process 105 then checks to see if the shared memory buffer 115 is full (step 510). If the shared memory buffer 115 is full, then the 16-bit process 105 sets the buffer status variable 120 to "full" (step 515) and sends the BufferFullEvent signal 130 to the 32-bit process 135 (step 520). Then at step 525 the 16-bit process 105 waits until it receives a BufferReadEvent 155 from the 32-bit process (indicating the shared memory buffer 115 has been emptied). At step 530, when the shared memory buffer 115 is known to have some room, the GDI data is written into the shared memory buffer 115. Finally at step 535 the buffer status variable 120 is set to "being filled," indicating that there is some data in the shared memory buffer 115.

A person skilled in the art will recognize that FIG. 5 only approximates the 16-bit process 105. For example, the GDI data received from the hooked GDI function 100 may be several times the size of the shared memory buffer 115. In that case, as much GDI data as possible is written to the shared memory buffer 115 in step 530, and control transfers to step 515 to mark the buffer status variable as "full." The 16-bit process 105 then sends the BufferFullEvent signal 130 to the 32-bit process 135 at step 520. When the 32-bit process sends the BufferReadEvent signal 150 back to the 16-bit process 105 at step 525, more GDI data is written to the shared memory buffer 115, and the method continues in this manner as needed.

Figure 6:
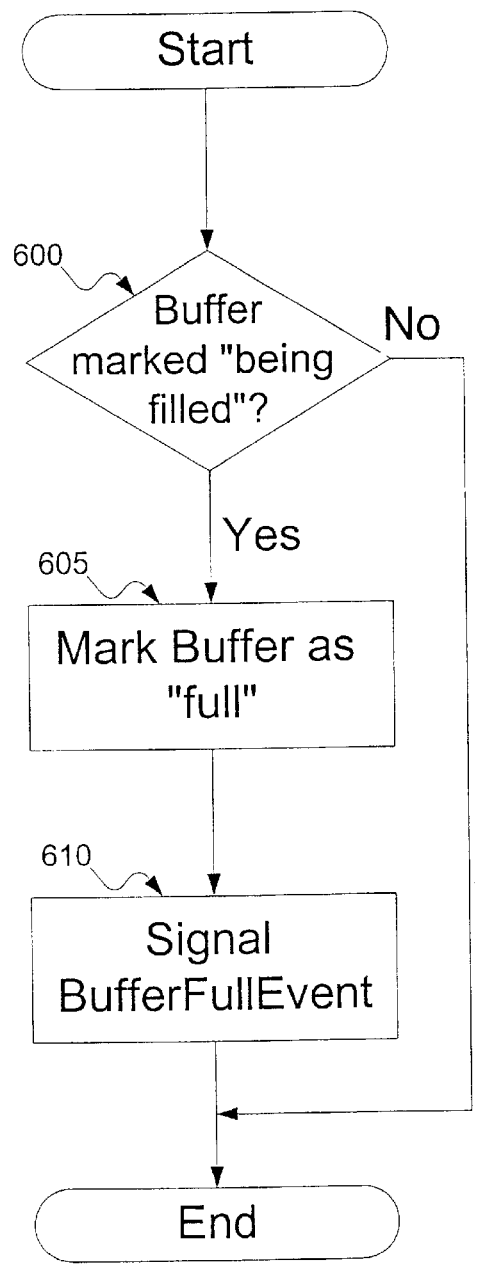
FIG. 6 shows a flowchart of the 16-bit process callback function that ensures data does not wait too long before it is passed to the 32-bit process for transmission.

FIG. 6 shows the callback function used by 16-bit process 105. This callback function is used to ensure that GDI data does not stay in the shared memory buffer 115 for too long before the 32-bit process 135 moves the GDI data into the send buffer 145. Since 16-bit callback functions must grab the mutual exclusion semaphore, there is no concern that GDI data will be coming in from a hooked GDI function 100 while the callback is active. Conversely, if GDI data is coming in from a hooked GDI function 100, then the callback function will block on the semaphore. The callback function is used only where the buffer status variable 120 is set to "being filled" (step 600). If the buffer status variable 120 is marked as "being filled" (indicating that there is data present in the shared memory buffer 115 which has not been received by the 32-bit process 135), the callback function marks the buffer status variable 120 as "full" (step 605). The callback function then sends the BufferFullEvent signal 130 to the 32-bit process 135 so that the data will be emptied from the shared memory buffer 115.

A person skilled in the art will recognize that the callback function does not need to be invoked with the buffer status variable 120 set as either "empty" or "full." If the buffer status variable 120 is set to "empty," then there is no data in the shared memory buffer 115. Alternatively, if the buffer status variable 120 is set to "full," then the 16-bit process 105 will have already sent a BufferFullEvent signal 130 to the 32-bit process 135.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method for transferring synchronized data from a remote computer to a local computer over a network connecting the local and remote computers, the method comprising:

generating the synchronized data with a 16-bit process of at least one operating system running on the remote computer;

storing the synchronized data with the 16-bit process;

retrieving the synchronized data with a first 32-bit process of at least one operating system running on the remote computer;

locking a semaphore, at least partly in response to the 16-bit process until at least after the synchronized data is retrieved with the first 32-bit process at least partly with a shared memory buffer coupled to the remote computer accessible to at least the 16-bit and first 32-bit processes; and transmitting the synchronized data with a second 32-bit process of at least one operating system over the network to the local computer.

2. A method according to claim 1 wherein the remote computer includes the shared memory buffer coupled to the remote computer accessible to the 16-bit and first 32-bit processes.

3. A method according to claim 2 wherein storing the synchronized data includes storing the synchronized data in the shared memory buffer by the 16-bit process.

4. A method according to claim 2 wherein retrieving the synchronized data includes retrieving the synchronized data from the shared memory buffer by the first 32-bit process.

5. A method according to claim 1 wherein transmitting the synchronized data includes storing the synchronized data in a queue coupled to the remote computer by the second 32-bit process if the synchronized data cannot be immediately transmitted over the network to the local computer.

6. A method according to claim 5 further including transmitting the synchronized data stored in the queue over the network by the second 32-bit process to the local computer when transmission is possible.

7. A method according to claim 1 wherein the remote computer includes a data ready signal.

8. A method according to claim 7 wherein storing the synchronized data includes signaling the first 32-bit process from the 16-bit process with the data ready signal after the synchronized data has been stored.

9. A method according to claim 8 wherein the 16-bit process includes tracking how much synchronized data has been stored in order to signal the first 32-bit process with the data ready signal.

10. A method according to claim 8 wherein the 16-bit process includes timing how much time has passed since the synchronized data was stored in order to signal the first 32-bit process with the data ready signal if the synchronized data has been stored a predetermined amount of time.

11. A method according to claim 10 wherein timing how much time has passed includes activating a callback function from the 16-bit process to measure how much time has passed since the synchronized data was stored.

12. A method according to claim 1 wherein the remote computer includes a data retrieved signal.

13. A method according to claim 12 wherein retrieving the synchronized data includes signaling the 16-bit process from the first 32-bit process with the data retrieved signal after the synchronized data has been retrieved.

14. A method according to claim 1 further including calling a hooked function on the remote computer from the 16-bit process to generate the synchronized data.

15. A method according to claim 14 further including modifying the hooked function to return the synchronized data to the 16-bit process rather than to use the synchronized data on the remote computer.

16. A method according to claim 1, wherein the semaphore is a mutual exclusion semaphore.

17. A method according to claim 16, wherein at least one of the processes executes on a Windows operating system.

18. A system for transferring synchronized data, the system comprising:
   a local computer for using the synchronized data;
   a remote computer where the synchronized data is generated;
   a network connecting the local computer and the remote computer for transmitting the synchronized data from the remote computer to the local computer;
   a 16-bit process of at least one operating system running on the remote computer for generating the synchronized data and storing the synchronized data; and
   a first 32-bit process of at least one operating system running on the remote computer for retrieving the synchronized data; and
   a second 32-bit process of at least one operating system running on the remote computer for transmitting the synchronized data over the network to the local computer,
   wherein the system locks a semaphore, at least partly in response to the 16-bit process until at least after the synchronized data is retrieved with the first 32-bit process at least partly with a shared memory buffer coupled to the remote computer accessible to at least the 16-bit process and the first 32-bit process.

19. A system according to claim 18 wherein the 16-bit process is constructed and arranged to store the synchronized data in the shared memory buffer coupled to the remote computer and accessible to the 16-bit and 32-bit processes.

20. A system according to claim 19 wherein the first 32-bit process is constructed and arranged to retrieve the synchronized data from the shared memory buffer.

21. A system according to claim 18 wherein the second 32-bit process is constructed and arranged to store the retrieved synchronized data in a queue coupled to the remote computer when the retrieved synchronized data cannot be immediately transmitted over the network to the local computer.

22. A system according to claim 21 wherein the second 32-bit process is constructed and arranged to transmit the retrieved synchronized data stored in the queue over the network to the local computer when transmission is possible.

23. A system according to claim 18 wherein the 16-bit process is constructed and arranged to signal the first 32-bit process after the synchronized data is stored.

24. A system according to claim 23 wherein the 16-bit process is constructed and arranged to signal the first 32-bit process if a predetermined amount of synchronized data is stored or if the synchronized data has been stored for a predetermined amount of time.

25. A system according to claim 18 wherein the first 32-bit process is constructed and arranged to signal the 16-bit process after the synchronized data is read.

26. A system according to claim 18, wherein the semaphore is a mutual exclusion semaphore.

27. A system according to claim 26, wherein at least one of the processes executes on a Windows operating system.

28. A computer-readable medium containing a program for transferring synchronized data from a remote computer to a local computer over a network connecting the local and remote computers, the program comprising:
   16-bit data generating software runable on at least one operating system of the remote computer for generating the synchronized data;
   16-bit data storing software runable on at least one operating system of the remote computer for storing the synchronized data;
   32-bit data retrieving software runable on at least one operating system of the remote computer for retrieving the synchronized data; and
   32-bit data transmitting software runable on at least one operating system of the remote computer for transmitting the synchronized data over the network to the local computer,
   wherein the program locks a semaphore, at least partly in response to the 16-bit data storing software until at least after the synchronized data is retrieved with the 32-bit data retrieving software at least partly with a shared memory buffer coupled to the remote computer accessible to at least the 16-bit data storing software and the 32-bit data retrieving software.

29. A program according to claim 28 wherein the 16-bit data storing software includes the 16-bit data storing software runable to store the synchronized data in the shared memory buffer coupled to the remote computer accessible to the 16-bit and 32-bit processes.

30. A program according to claim 29 wherein the 32-bit data retrieving software includes the 32-bit data retrieving software runable to retrieve the synchronized data from the shared memory buffer.

31. A program according to claim 28 wherein the 32-bit data transmitting software includes the 32-bit data transmitting software runable to store the synchronized data in a queue coupled to the remote computer if the synchronized data cannot be immediately transmitted over the network to the local computer.

32. A program according to claim 31 further including the 32-bit data transmitting software runable to transmit the synchronized data stored in the queue over the network to the local computer when transmission is possible.

33. A program according to claim 28 wherein the 16-bit data storing software includes the 16-bit data storing software runable to signal the 32-bit data retrieving software after the synchronized data has been stored.

34. A program according to claim 28 wherein the 32-bit data retrieving software includes the 32-bit data retrieving software runable to signal the 16-bit process after the synchronized data has been retrieved.

35. A program according to claim 28, wherein the semaphore is a mutual exclusion semaphore.

36. A program according to claim 35, wherein at least one of the processes executes on a Windows operating system.

* * * * *